United States Patent
Bodin

(10) Patent No.: US 7,797,170 B2
(45) Date of Patent: *Sep. 14, 2010

(54) LOCATION BASED SERVICES REVENUE SHARING AND COST OFFSETTING

(75) Inventor: William Kress Bodin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/184,217

(22) Filed: Jul. 31, 2008

(65) Prior Publication Data

US 2008/0288315 A1  Nov. 20, 2008

Related U.S. Application Data

(63) Continuation of application No. 10/290,391, filed on Nov. 7, 2002, now Pat. No. 7,447,642.

(51) Int. Cl.
*G06Q 99/00* (2006.01)

(52) U.S. Cl. .............................. 705/1.1; 705/14; 705/26; 709/226; 370/259; 455/154.1

(58) Field of Classification Search .................. 705/1, 705/14, 400, 1.1, 26; 455/154.1; 709/226; 370/259

See application file for complete search history.

(56) References Cited

U.S. PATENT DOCUMENTS

| | | | |
|---|---|---|---|
| 4,965,821 A | 10/1990 | Bishop et al. | |
| 5,210,789 A | 5/1993 | Jeffus et al. | |
| 5,214,582 A | 5/1993 | Gray | |
| 5,442,553 A | 8/1995 | Parrillo | |
| 5,619,412 A | 4/1997 | Hapka | |
| 5,815,071 A | 9/1998 | Doyle | |
| 5,831,992 A | 11/1998 | Wu | |
| 5,898,680 A | 4/1999 | Johnstone et al. | |
| 5,922,037 A | 7/1999 | Potts | |
| 5,948,040 A | 9/1999 | DeLorme et al. | |
| 6,064,971 A | 5/2000 | Hartnett | |
| 6,067,570 A | 5/2000 | Kreynin et al. | |
| 6,083,248 A | 7/2000 | Thompson | |
| 6,094,609 A | 7/2000 | Arjomand | |

(Continued)

OTHER PUBLICATIONS

Jules, Coleman, Markets, Morals, and the Law, Oct. 2002, Oxford University Press, pp. 87-91, 94, 98, 104-105.*

(Continued)

*Primary Examiner*—John W Hayes
*Assistant Examiner*—Freda A Nelson
(74) *Attorney, Agent, or Firm*—Robert H. Frantz; Jill A. Poimboeuf; Libby Z. Toub

(57) ABSTRACT

An opportunity server tracks in vehicle information system wireless web transactions using session identifiers, aggregates transaction records into session data, and uses session data assign cost of network and system usage to a winning bidding party in an online offering system so as to offset costs to the user for usage of the system. Credits are posted to share revenue and offset costs of OEM equipment and network access metered fees, thereby reducing the cost of the transactions by a user and promoting unfettered use of in vehicle information systems for a variety of services, purposes, and transactions.

5 Claims, 6 Drawing Sheets

U.S. PATENT DOCUMENTS

| | | | |
|---|---|---|---|
| 6,105,063 | A | 8/2000 | Hayes, Jr. |
| 6,285,931 | B1 | 9/2001 | Hattori et al. |
| 6,289,382 | B1 | 9/2001 | Bowman-Amuah |
| 6,292,724 | B1 | 9/2001 | Apsell et al. |
| 6,313,786 | B1 | 11/2001 | Sheynblat et al. |
| 6,330,499 | B1 | 12/2001 | Chou et al. |
| 6,339,736 | B1 | 1/2002 | Moskowitz et al. |
| 6,362,730 | B2 | 3/2002 | Razavi et al. |
| 6,370,454 | B1 | 4/2002 | Moore |
| 6,379,454 | B1 | 4/2002 | Fellert |
| 6,529,808 | B1 | 3/2003 | Diem |
| 6,571,279 | B1 | 5/2003 | Herz et al. |
| 6,640,166 | B2 | 10/2003 | Liebl et al. |
| 6,647,328 | B2 | 11/2003 | Walker |
| 6,691,253 | B1 | 2/2004 | Gillenwater et al. |
| 6,717,527 | B2 | 4/2004 | Simon |
| 6,718,235 | B1 | 4/2004 | Borugian |
| 6,748,322 | B1 | 6/2004 | Fernandez |
| 6,754,562 | B2 | 6/2004 | Strege et al. |
| 6,801,604 | B2 | 10/2004 | Maes et al. |
| 6,847,872 | B2 | 1/2005 | Bodin et al. |
| 6,917,417 | B2 | 7/2005 | Strege et al. |
| 6,961,760 | B2 | 11/2005 | Li et al. |
| 6,978,316 | B2 | 12/2005 | Ghaffar et al. |
| 7,054,648 | B2 | 5/2006 | Abtin et al. |
| 7,123,877 | B2 | 10/2006 | Lin |
| 7,151,745 | B2 | 12/2006 | Lin et al. |
| 7,171,189 | B2 | 1/2007 | Bianconi et al. |
| 7,200,566 | B1 * | 4/2007 | Moore et al. ............... 705/26 |
| 7,440,753 | B2 | 10/2008 | Chen et al. |
| 7,583,932 | B2 | 9/2009 | Lin |
| 2001/0029478 | A1 | 10/2001 | Laster et al. |
| 2001/0036224 | A1 | 11/2001 | Demello et al. |
| 2001/0037168 | A1 | 11/2001 | Hozuka |
| 2001/0056396 | A1 | 12/2001 | Goino |
| 2001/0056544 | A1 | 12/2001 | Walker |
| 2002/0007778 | A1 | 1/2002 | Ford et al. |
| 2002/0044049 | A1 | 4/2002 | Saito et al. |
| 2002/0045976 | A1 | 4/2002 | Kodama |
| 2002/0049535 | A1 | 4/2002 | Rigo et al. |
| 2002/0057678 | A1 | 5/2002 | Jiang et al. |
| 2002/0077780 | A1 | 6/2002 | Liebl et al. |
| 2002/0077781 | A1 | 6/2002 | Liebl et al. |
| 2002/0119766 | A1 | 8/2002 | Bianconi et al. |
| 2002/0120685 | A1 | 8/2002 | Srivastava et al. |
| 2003/0009401 | A1 | 1/2003 | Ellis |
| 2003/0017826 | A1 | 1/2003 | Fishman et al. |
| 2003/0078019 | A1 * | 4/2003 | Dorenbsoch et al. ...... 455/154.1 |
| 2003/0093187 | A1 | 5/2003 | Walker |
| 2003/0130893 | A1 * | 7/2003 | Farmer ................... 705/14 |
| 2003/0158894 | A1 | 8/2003 | Ziserman |
| 2003/0163249 | A1 | 8/2003 | Kapolka et al. |
| 2003/0172090 | A1 | 9/2003 | Asunmaa et al. |
| 2003/0195845 | A1 | 10/2003 | Anton, Jr. et al. |
| 2004/0010592 | A1 * | 1/2004 | Carver et al. ............... 709/226 |
| 2004/0030995 | A1 | 2/2004 | Bhogal et al. |
| 2004/0064258 | A1 | 4/2004 | Ireland |
| 2004/0064268 | A1 | 4/2004 | Gillenwater et al. |
| 2004/0125755 | A1 * | 7/2004 | Roberts ................... 370/259 |
| 2004/0198381 | A1 | 10/2004 | Siegel et al. |
| 2004/0203581 | A1 | 10/2004 | Sharon et al. |
| 2004/0205694 | A1 | 10/2004 | James et al. |
| 2004/0215665 | A1 | 10/2004 | Edgar et al. |
| 2006/0274896 | A1 | 12/2006 | Livesay |

OTHER PUBLICATIONS

USPTO, Office Actions and Applicant Replies in related U.S. Appl. No. 10/232,246, retrieved from USPTO online Image File Wrapper (IFW).

IBM; "Information Everywhere: New Opportunities for Pervasive Technology", IBM Corp., Mar. 2000, 8 pages.

USPTO, Office Actions and Applicant Replies in related U.S. Appl. No. 10/290,399, now issued as US 6,847,872, retrieved from USPTO online Image File Wrapper (IFW).

Frenzel, Louis E.; "Wireless PAN Alternatives To Bluetooth", Electronic Design magazine; Jun. 24, 2002; retrieved on Jan. 15, 2010 from http://electronicdesign.com/; 2 pages.

USPTO, Examination Correspondence (Office Action, Applicant Replies) in related U.S. Appl. No. 11/843,945, filed Aug. 23, 2007, retrieved Jan. 22, 2010 from USPTO Pair IFW.

IBM Corp.; "Information Everywhere—New Opportunities for Pervasive Technology"; Mar. 2000, retrieved from http://www.ibm.com; 8 pages.

"Information Everywhere—New Opportunities for Pervasive Technology", IBM Corporation, Mar. 2000, downloaded from http://www.ibm.com. 8 pages.

Benjaminy et al.; Delivering diagnostic solutions with cost expert systems; A case study, 1999, IEEE, p. 367-371, cited by Examiner and available in Private PAIR IFW in U.S. Appl. No. 10/980,728 (not available to download via Public PAIR).

USPTO, Office Actions and Applicant Replies in related U.S. Appl. No. 11/263,713, retrieved from USPTO online Image File Wrapper (IFW).

Patent application examination correspondence, U.S. Appl. No. 10/290,399, filed Nov. 7, 2002, issued as US patent 6,847,872, filed by William Kress Bodin on Nov. 7, 2002, compiled from our own file wrapper as the published Patent Application Information Retrieval (PAIR) does not contain an Image File Wrapper (IFW).

United States Patent Office, patent application examination correspondence, U.S. Appl. No. 10/980,728, filed Nov. 3, 2004, issued as US patent 6,983,200, filed by William Kress Bodin on Nov. 3, 2004, published at and retrieved from http://www.uspto.gov Patent Application Information Retrieval (PAIR) Image File Wrapper (IFW) on Mar. 4, 2010.

United States Patent Office, patent application examination correspondence, U.S. Appl. No. 10/290,381, filed Nov. 7, 2002, now abandoned, filed by William Kress Bodin on Nov. 7, 2002, published at and retrieved from http://www.uspto.gov Patent Application Information Retrieval (PAIR) Image File Wrapper (IFW) on Mar. 4, 2010.

United States Patent Office, patent application examination correspondence, U.S. Appl. No. 10/290,223, filed Nov. 7, 2002, issued as US patent 7,346,439, filed by William Kress Bodin on Nov. 7, 2002, published at and retrieved from http://www.uspto.gov Patent Application Information Retrieval (PAIR) Image File Wrapper (IFW) on Mar. 4, 2010.

United States Patent Office, patent application examination correspondence, U.S. Appl. No. 10/290,391, filed Nov. 7, 2002, issued as US patent 7,447,642, filed by William Kress Bodin on Nov. 7, 2002, published at and retrieved from http://www.uspto.gov Patent Application Information Retrieval (PAIR) Image File Wrapper (IFW) on Mar. 4, 2010.

United States Patent Office, patent application examination correspondence, U.S. Appl. No. 10/290,390, filed Nov. 7, 2002, now abandoned, filed by William Kress Bodin on Nov. 7, 2002, published at and retrieved from http://www.uspto.gov Patent Application Information Retrieval (PAIR) Image File Wrapper (IFW) on Mar. 4, 2010.

USPTO, Office Actions and Applicant Replies in related U.S. Appl. No. 10/980,728, now issued as US 6,983,200, retrieved from USPTO online Image File Wrapper (IFW).

* cited by examiner

LOCATION BASED SERVICES REVENUE SHARING AND COST OFFSETTING

CROSS-REFERENCE TO RELATED APPLICATIONS

Claiming Benefit Under 35 U.S.C. 120

This application is a continuation of U.S. patent application Ser. No. 10/290,391, filed on Nov. 7, 2002, now U.S. Pat. No. 7,447,642, which was related to U.S. patent application Ser. No. 10/232,246, filed on Aug. 29, 2002, both by William Kress Bodin, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Related U.S. patent application Ser. No. 10/290,391, filed on Nov. 7, 2002, U.S. Pat. No. 7,447,642 and U.S. patent application Ser. No. 10/232,246, filed on Aug. 29, 2002 are both incorporated by reference in their entireties.

BACKGROUND OF THE INVENTION

1. Field of the Invention

This application is a continuation of U.S. patent application Ser. No. 10/290,391, filed on Nov. 7, 2002, now U.S. Pat. No. 7,447,642, which was related to U.S. patent application Ser. No. 10/232,246, filed on Aug. 29, 2002, both by William Kress Bodin, et al. This invention relates to technologies for anonymous session tracking of wireless online service consumers and clients, such as tracking of service sessions of a vehicle in transit which is equipped with an in vehicle information system. This invention also relates to technologies for cost and revenue sharing by the various parties providing online services in order to offset or remove cost of service access to a customer.

2. Background of the Invention

Many vehicles and private individuals are now equipped with mobile access devices for obtaining services over a computer network. Such devices currently include wireless personal communications services ("PCS") telephones with microbrowsers, personal digital assistants ("PDAs") with wireless web (e.g. wireless modem) interfaces, and mobile personal computers (e.g. laptop computers) with wireless access. Some of these devices are "built in" to a vehicle, such as an in-dash system, while others are "man portable" such as handheld PDAs, cell phones, and laptop computers. As technology evolves, the distinction between these devices is expected to continue to disappear. For example, one can currently purchase a PCS telephone and add wireless web browsing service to it, although the display and sound capabilities are somewhat limited. Alternatively, one may purchase a PDA which has better sound and display capabilities, and add a wireless modem to the PDA to enable it to access web sites, as well. And, of course, for maximum display and sound capabilities, one may purchase a laptop computer and add a wireless network interface to it.

Further to this disintegration of distinctive functions and capabilities is the rapid proliferation of the latest memory and computing technology to the "low end" or handheld devices. For example, the some of the latest PDAs offered by companies such as Palm Computing, HP-Compaq, and Sharp boast processor speeds such as 233 MHz, 16 MB memory, 65000-color graphic display, and a USB interface, which matches or rivals the specifications of full-size personal computers of just a few years ago.

Additionally, many of these systems are now provide location or global positioning functions, which allow the software running on the systems to determine the location or position of the system (and user). Such available technologies include cell-tower triangulation which is available in many PCS telephone, the Federal Communications Commission's enhanced 911 ("E911") technology, the Global Positioning System ("GPS"), as well as other older or proprietary technologies (e.g. LORAN-C, etc.) Add-in cards for personal computers and PDA's can provide these location functions, while mobile telephones tend to be manufactured or configured for this function prior to delivery to a client, presently. Other short range or "micro-cell" technologies such as Blue-Tooth make "regional" services available, as well, such as when a suitably equipped device is within range of another similarly equipped device (e.g. near a vending machine, ATM, ticket dispenser, etc.).

Coupling the location functionality of a wireless access device to the other software functions of the device such as web browsing, messaging, etc., many location-based services ("LBS") are enabled. Such services include, but are not limited to, automatically mapping routes for travelers, finding hotel or restaurant reservations, inspecting travel options (e.g. train or plane schedules) and purchasing tickets, etc. The software running on the device may collaborate with servers on the network for such services, transmitting location information with need requirements, and receiving options for the user to review and select.

In the related patent application, such an example of a service for a mobile system was disclosed in which an in-vehicle information system ("IVIS") was provided which could coordinate the solicitation of bids for a needed repair service in advance of the vehicle arriving at a destination according to a travel itinerary. In an arrangement which will be reviewed in more detail in the following paragraph, multiple provider servers respond to a single request for fulfillment of a need for a business transaction such as a car repair. The bids received in response are processed by another server, and transmitted to the IVIS for review and selection by the vehicle's operator. Using the invention disclosed in the related patent application, a vehicle operator could obtain competitive pricing for service, and the "winning" provider could coordinate the availability of spare parts (e.g. materials), a suitable shop bay (e.g. facilities) and a repair technician (e.g. personnel). In a broader sense, the invention allow for anticipatory brokering for services and products with materials and resource planning ("MRP") and supply chain management ("SCM") or enterprise resource planning ("ERP") for user's of mobile access devices.

Many of these mobile access devices, however, are provided "connection" or data services on a metered basis rather than a flat-rate basis, unlike the older, flat-rate model which applies to most stationary access devices. For example, a personal computer on a desktop may be provided with access to the Internet via a dial-up model and telephone line or a dedicated data link (e.g. T1 or T3) supplied by a data services company or a telephone company. The costs of these services are usually set as a fixed rate per month, hour, etc., regardless of the amount of usage of the data bandwidth. For example, a T1 line carries 1.5 MBits/sec bidirectionally. If an enterprise subscribes to a T1 service for data communications, the service provider will charge the enterprise a flat rate per month regardless of how much "real" data is actually transmitted or received over the T1 line during the month-long period.

As such, in a flat-rate paradigm, users are encouraged to access web sites, send data, transmit e-mails with large attachments, etc., because there is no penalty or premium for doing so. Most of the companies which offer such flat rate models recoup the costs through other means such as advertising to the users.

In a metered access arrangement, however, the user or subscriber may be charged a base rate, such as a monthly access charge, plus an amount related to actual usage. For example, many long distance calling plans require payment of a small monthly fee plus a few cents per minute of actual usage. In some plans, a certain amount of usage may be allowed within the base rate, beyond which a metered formula applies (e.g. per minute or per megabyte, etc.). Utilities such as electricity, natural gas and water are some of the oldest services and products which are provided on a metered basis. More modern examples of metered service providers include some Internet Service Providers ("ISP"), for example, which offer a lower monthly rate than flat-rate providers, which includes a few hours access per month, above which an hourly charge applies.

In metered service paradigms, the client or customer bears the cost of usage, and thus becomes aware and sensitive to usage amount. Each customer develops an intangible threshold value of what services or activities are "worth" the cost to use based upon the service and the metering plan. For example, most PCS telephone services are provided with a base rate which includes a base "block" of minutes access, such as $29.99 for 100 minutes nationwide calling. Additional minutes may be available for 10 cents per minute. Further, there may be a $1.50 initial set up charge for establishing a wireless web browsing session, followed by consumption of "minutes" either from the base block, if available, or at the per-minute charge.

In such a situation, the user becomes more sensitive to "useless" web content which takes noticeable time to download and execute on the wireless access device. A web site which is graphically rich with bitmap images, animated images, sound and video clips may be very appealing to users who access it through a flat-rate plan, but for those users accessing it through a metered plan, the site may represent unnecessary waste of "minutes" and unnecessary cost. The users of the latter type, then, may prefer and gravitate towards "bare bones" or text-only web sites because they can be accessed more quickly and less expensively.

This cost model is expected to continue to be a barrier to the widespread use of wireless web services, including those provided to mobile systems such as the system described in the related patent application. In some situations, the providers of services may be interested in participating in a cost-sharing arrangement with the users or clients to offset the users' costs to access and use the providers' web sites and services. However, there is currently no method available to perform such cost sharing or cost offsetting.

Additionally, if there were a cost sharing arrangement, users may become concerned that the information obtained by the provider regarding the user's activities may allow the provider to create a broader profile of the user. For example, most credit cards such as VISA or MasterCard are cost sharing arrangements. When a credit card holder pays for a service or product with a credit card, the retailer (not the card holder) or service provider is typically charged a fee based upon the purchase price, often in the range of 2% to 6% of the purchase price. While the card holder does not see a fee for use of the card (e.g. the card appears to be free to use), the retailer receives only a portion of the actual sale price (sale price less the handling fee).

While this arrangement allows a card holder to mentally justify the use of the card in lieu of a cash payment because there is no penalty or premium for using the card, it also provides a detailed record of the card holder's purchases, which is available to the retailer and the company which issued the credit card. This information turns out to be very valuable information which can be used to generate personal profiles for each card holder with respect to their buying habits, brand preferences, disposable income, etc. Further, the data can be summed, averaged, sorted and otherwise analyzed on a larger basis to develop highly accurate demographic data.

For example, purchases for all persons who bought steak at a grocery store could be analyzed to see what beverage (e.g. beer, wine, tea, coffee, tea, soft drinks, etc.) is the most common purchased at the same time, implying which type and brand of beverage is the most popular to consume with steak. The same analysis could be performed with respect to purchases of hamburger meat, patties, or hot dogs, as well as other types of purchases such as clothing accessories, automobile products, computer products, housewares, etc.

This type of actual purchase information can yield much more useful and accurate insight into consumer behavior and preferences than traditional focus groups and marketing surveys. Consumers, however, are becoming much more savvy with respect to such seemingly "free" services, having been exposed to inundating blitzes of junk mail, both in the real world and online, as well as alarmingly well targeted telemarketing. As such, new services and products offered under cost-sharing plans are received cautiously and doubtfully unless privacy can be assured.

Therefore, there is a corresponding need in the art for a technology to provide anonymous session tracking which can support cost and revenue sharing without compromising personal privacy or exposing user habits and patterns to suppliers and vendors who may violate the trust of the clients.

BRIEF DESCRIPTION OF THE DRAWINGS

The following detailed description when taken in conjunction with the figures presented herein provide a complete disclosure of the invention.

SUMMARY OF THE INVENTION

Figure 1:
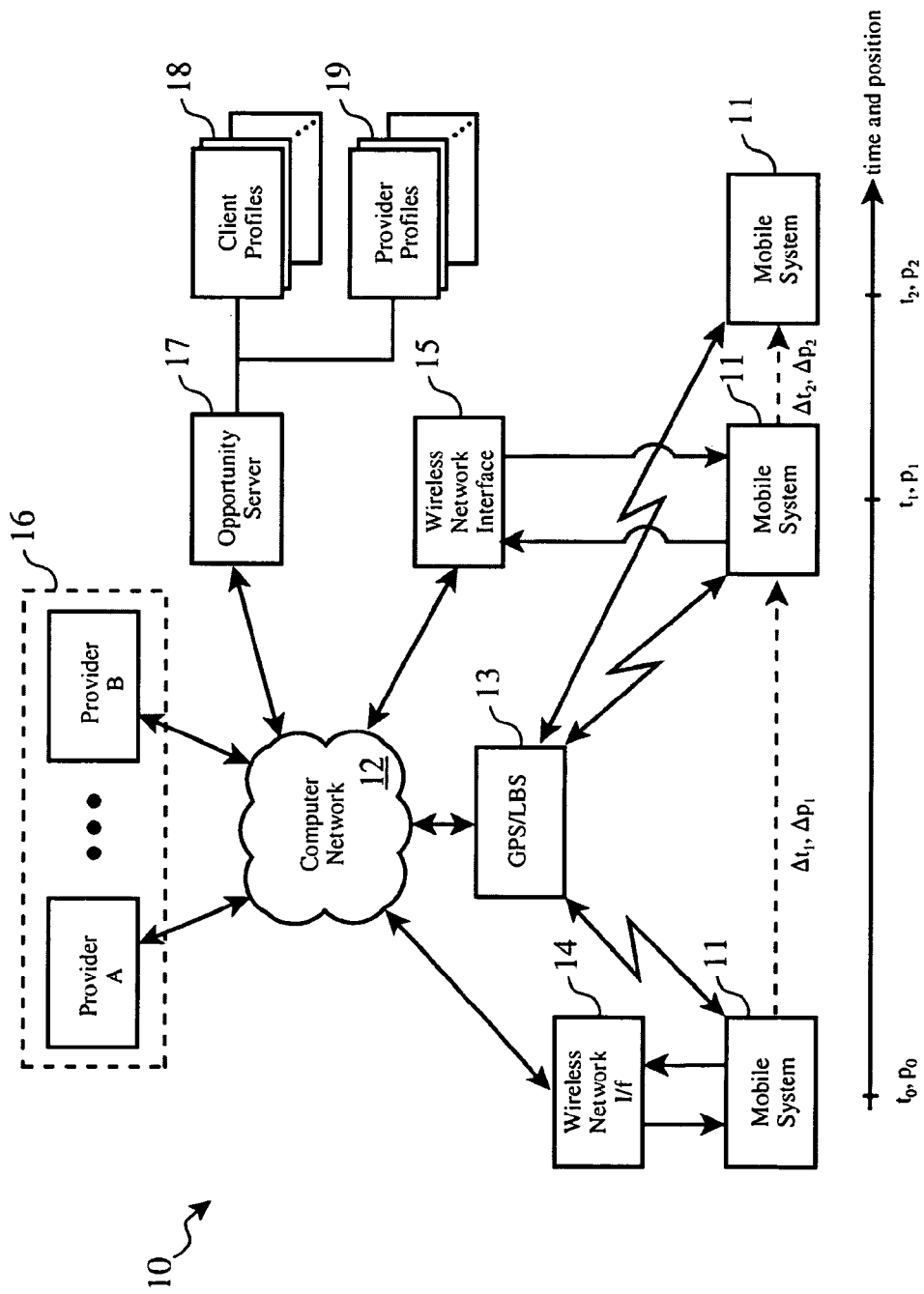
FIG. 1 shows the high level organization of the system according to the invention.

The invention provides a method and system which, in a first aspect, tracks location-based services for wirelessly networked mobile systems using anonymous identifiers ("ID")

which are assigned randomly at the beginning of the session and released at the end of the session. Session data, such as driving conditions, driver's actions (purchases, declines, requests, rest periods, etc.) is persistently associated with the session ID, thereby disassociating the session data with the user's true identity. The release IDs are recycled for random use with other users.

In a second aspect of the present invention, the collected session data is used to produce aggregated data for consumption by a wide variety of enterprises such as insurance companies, fuel suppliers, urban planners, law enforcement, equipment manufacturers, service providers (e.g. repair shops, stores, restaurants, etc.), and governmental agencies.

In a third aspect of the present invention, revenue and cost sharing is enabled based upon session data to offset access charges incurred by each user, thereby allowing users to access services freely and without concern for content of online services (e.g. avoiding graphically rich web sites), and without concern for loss of privacy of the user's actions, habits, and patterns.

DETAILED DESCRIPTION OF THE INVENTION

The system and method integrate several well-known technologies via an application server and one or more computer networks, as shown in figures presented herein. In one possible embodiment, the system is realized as an extension to the anticipatory services brokering and planning technology disclosed in the related patent application. This variety of embodiment will be discussed in detail in order to illustrate a use of the invention. However, it will be recognized by those skilled in the art that the scope of the present invention extends to many other uses and applications of our new technology. The following technologies and terminologies are used within this disclosure:

Location Based Services ("LBS")—a set of services which are associated with and driven by the location of a device such as a wireless telephone, personal digital assistant, or other computer. LBS may use one of several available technologies to determine the geographic location of a device, including but not limited to GPS, the Federal Communication Commission's Enhanced 911 ("E911") or micro-networks such as open-standard BlueTooth.

Global Positioning System ("GPS")—any one of several available technologies for determining geographic position electronically, including most prevalently use of a network of satellites in geosynchronous orbit and a receiver to pinpoint the receiver's location. Older systems, such as LORAN and TRANSIT, may be used, as well. Regional positioning may be determined using signal triangulation or other methods commonly employed to determine in which cell in a cellular system a transceiver is located.

Computer network—most preferably the Internet, but also possibly local area networks ("LAN"), wireless area networks ("WAN"), private networks and intranets.

Wireless network—any suitable communications network for data transmission and reception including Personal Communications Systems ("PCS"), wireless LAN, light wave (e.g. infrared) networks, and radio-based data links, all of which may be of proprietary nature or may conform to one of many well-known wireless standards.

Mobile System—used generally to refer to any system which is able to diagnose its own faults and failures and which may be transported, and especially, but not limited to, the control and diagnostic computers for vehicles such as automotive Electronic Control Modules ("ECM"). A mobile system, however, does not have to be part of a vehicle, but may be vehicle-born, such as certain electronic systems carried in aircraft and ships which may need maintenance actions.

Enterprise Resource Planning ("ERP")—broadly, a set of activities and technologies employed by businesses to effectively plan and use their resources, including materials ordering, order receipt and fulfillment, billing and accounts payable, personnel scheduling and the like.

Supply Chain Management ("SCM")—a group of technologies and methods for coordinating the activities of multiple suppliers to achieve a goal such as delivering a service with certain materials. SCM includes the computer systems used to receive orders and requests for quotes, systems for determining current and future inventories, methods for calculating labor times and values, automated quote generation systems, and systems for executing orders and deliveries of materials.

Mobile System Diagnostic System—any system used to diagnose a mobile system such as a vehicle or other system which can be transported. We will use terms conventional to the automotive industry for this disclosure to broadly encompass similar terms from other mobile systems industries such as aviation, rail and maritime shipping. For example, we will refer to records regarding detected failures and potentially diagnosed root causes as Diagnostic Trouble Codes ("DTC"), and the computer which performs the monitoring of sensors, recording of failures and conditions, and transmission of DTC records as an electronic control module ("ECM"). It will be evident to those skilled in the art that the invention is not related to an automotive implementation, and that the use of these terms from automotive parlance is for understandability and presentation of a preferred embodiment only.

Our Example Application and Use

The invention of the related patent application integrates the on-board diagnostics capabilities of mobile systems such as vehicles, location based services technologies, and networked supply chain management technologies to provide anticipatory arrangement of required services and maintenance actions. Based upon real-time fault condition detection in a mobile system and upon the system's location and direction of travel, one or more potential geographic points of service, preferably within the scheduled itinerary of travel, is determined. The fault or trouble indicators are then analyzed to determine minimum service provider characteristics (e.g. hours of operation, staff qualifications, equipment and parts on-hand, etc.), and quotes or estimates for expected service actions are solicited and collected from partner provider systems.

These quotes are analyzed and presented to the mobile system operator for selection, either manually or automatically, based upon user preferences. If a service provider is selected, the service is scheduled according to an estimated time of arrival of the mobile system, including arranging for parts to be procured in advance such that there is minimal delay to the travel itinerary for the completion of the service.

If no service provider is found or selected, a second wider search for potential providers may be made to minimize deviation from the itinerary, including solicitation of quotes and estimates, selection and scheduling of the service actions.

Turning now to FIG. 1, the general system organization (10) of the invention is shown. A mobile system, such as a car ECM, initially is a location or position $p_0$ at an initial time $t_0$ when a fault, failure or out-of-range condition is detected within a monitored system. Using a GPS or LBS subsystem such as a GPS receiver, the initial position $p_0$ is recorded with the DTC regarding the detected conditions, as well as with any DTC's which are the result of diagnostic analysis to determine the root cause of the detected condition.

For example, if a low fuel pressure level is detected, the ECM may record the position of the vehicle at the time the condition is detected in a first DTC, and may check other sensors for indications to assist in diagnosing the root cause of the failure. It may be diagnosed that the fuel filler cap may need to be checked or replaced. This diagnosis may be recorded in a second DTC, in typical ECM systems. According to one available embodiment, DTC's are recorded in a format commonly understood by automotive diagnostic computers, such as the International Standards Organization's Controller-Area Network ("CAN") or Society of Automotive Engineers' J1850 format. Any format which records this information, however, may be equally well employed to realize the invention, especially for non-automotive applications as previously discussed.

These DTC's are then transmitted to an opportunity server (17), via a first wireless network, and secondly by a computer network (12). In one possible embodiment, the wireless network interface is an IBM eNetworks Wireless Switch coupled with convention wireless data communications facilities such as a Personal Communications System ("PCS") transceiver. Other wireless network solutions, such as Motorola's Ricochet network, may be employed as well. The computer network is preferably the well-known Internet, but may be a proprietary or private network (e.g. LAN, WAN, etc.).

The opportunity server receives the DTC's, consults a set of user profiles to determine any user preferences (19) known for the driver (e.g. preference to take his or her car to dealers only), and then determines if there are any potential providers in the future vicinity of the mobile system (e.g. next or previous town on the travel route). Those potential providers (16) are then issued a bid request using ERP and/or electronic data interchange ("EDI") types of communications. To respond to the request for bid, each provider preferably certifies that they have (or will have) stock of necessary components, qualified staff on hand, and the necessary equipment to complete the maintenance action at the time of estimated arrival of the mobile system.

Providers may be eliminated or sorted according to the user preferences, such as manufacturer dealers, automobile association ratings, etc.

One or more providers (16), then, may respond with quotes and estimates, which are then coalesced by the opportunity server (15) for downloading and presenting to the mobile system operator (e.g. car driver) via the computer network (12) and wireless interface (14). Presentation of the operator's options may be made graphically using a display on the vehicle's control panel (e.g. a TFT or LCD display on a car dashboard, computer display on a ship's helm, etc.), or audibly via a speakerphone or stereo system. The vehicle operator may then select a provider, which causes the opportunity server to confirm the bid and appointment to the winning provider.

When the mobile system arrives at the anticipated location $p_1$ on or about the anticipated time of arrival $t_1$, the service action may be made without unnecessary delays waiting for parts, personnel, or shopping for an acceptable cost or price.

If no provider is selected or no acceptable bid is made in the first search, the opportunity server (17) may repeat the search and offer process for a subsequent location $p_2$ and expected time of arrival $t_2$ which is either part of the operator's desired itinerary or within an acceptable deviation from the desired itinerary.

Figure 2:
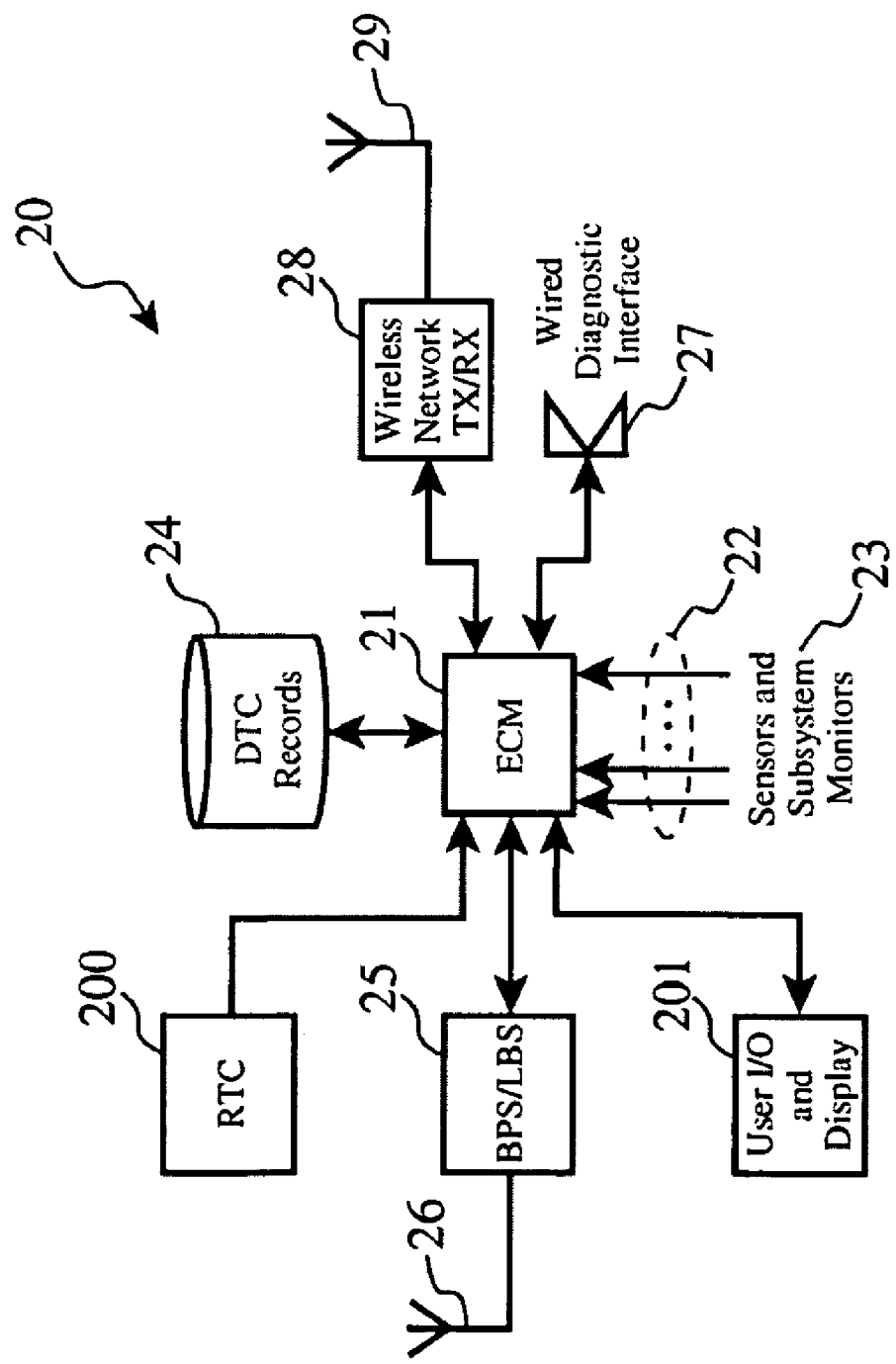
FIG. 2 provides details of an enhanced electronic control module as used for illustration and disclosed in the related patent application.

Turning to FIG. 2, details of the enhanced ECM (20) of the mobile system according to one possible embodiment are shown. The ECM (21), which includes a microprocessor or microcontroller, is interfaced (22) to a plurality of sensors and other subsystem monitors (e.g. controllers in a transmission, fuel injectors, etc.) via a bus such as the aforementioned J1850 or CAN bus, or appropriate proprietary or standard bus according to an alternate embodiment and vehicle application. Through this interface (22), the ECM receives information regarding detected failures, faults and out-of-range conditions, which are recorded in DTCs in the ECM memory (24).

The enhanced ECM (20) is also provided with location means, such as a GPS receiver or LBS-enabled wireless interface (25, 26), as well as a real-time clock (200). The location of the vehicle at the time of the detected event is recorded either with each DTC or in a separate DTC associated with the first DTC. Contact is then initiated through a wireless network interface (28, 29), such as a PCS interface, to the remote opportunity server, and the DTC's are transmitted or uploaded to the server.

Using the wireless network interface (28, 29), the enhanced ECM (20) may receive the coalesced opportunities (e.g. collected and qualified bids or offers from the providers) from the opportunity server, display or present them through the user interface (201), and receive a user selection. Presentation may be through a visual display, such as using an LCD or TFT display, or audibly using text-to-speech or telephone audio channels. The user's selection, such as a speech-recognized "yes" or "no" or input from a touch screen, may be transmitted back to the opportunity server via the wireless interface.

Some of these functions may be provided in combination with each other. For example, GPS operates on transmission of time-based signals from satellites to the GPS receivers, and as such, a GPS receiver includes a real-time clock. Also, a PCS phone which is LBS-enabled can also be employed as the wireless network interface.

Figure 3:
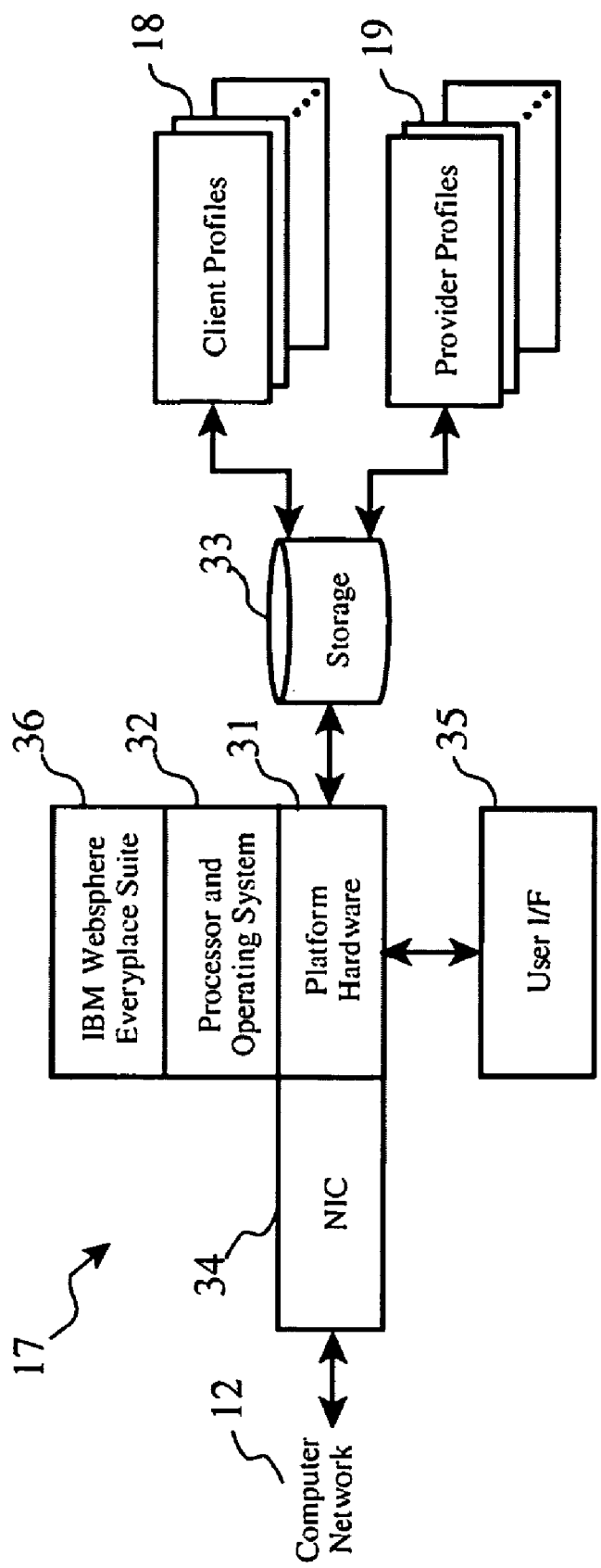
FIG. 3 provides details of the opportunity server.

FIG. 3 provides more details of the opportunity server (17), which includes a common web server computing hardware platform (31) and operating system (32). The computing platform is preferably an IBM eServer such as the IBM i-Series, or any other suitable computer platform such as an IBM-compatible personal computer, Sun Microsystem's server, or other capable computer. The hardware platform is also preferably equipped with a network interface ("NIC") (34) for communication with the computer network (12) such as the Internet. The NIC (34) may be as simple as a modem, or as sophisticated as a high bandwidth digital subscriber loop ("DSL") or T-1 interface (or better). The hardware platform is also preferably provided with a set of user interface devices (35) such as a display, keyboard and mouse, for administration and configuration activities.

The operating system is preferably IBM's AIX operating system, which is well adapted to web server applications, but may also be any other suitable operating system including but not limited to IBM's OS/2, Sun Microsystem's Solaris, Unix, Linux, or Microsoft's Windows. The opportunity server is also preferably provided with one or more persistent storage devices (33) such as a disk array.

To realize the invention in the opportunity server, a web server suite, preferably IBM's WebSphere Everyplace Suite, is provided with a number of application programs or scripts to implement the logical processes of the invention, as described in the preceding paragraphs and in more detail in the following paragraphs. The WebSphere product is well known in the industry, and methods and tools for implementing custom logical processes for networked business solutions are commonplace as the WebSphere product is widely in use by businesses, financial institutions, and government agencies around the world. Other suitable a capable software programs and/or suites may be utilized in place of the WebSphere product without departing from the spirit and scope of the present invention.

Figure 4:
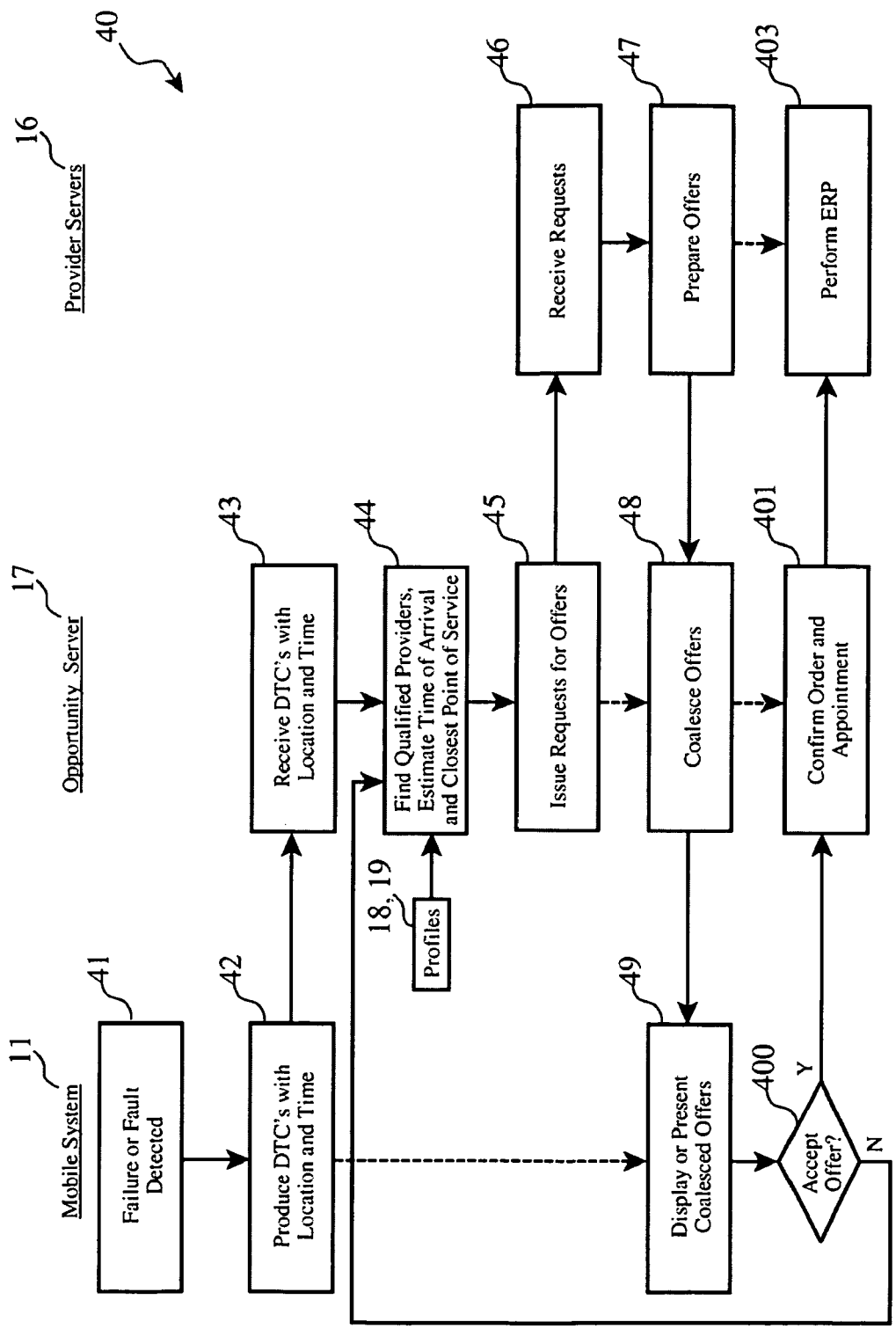
FIG. 4 sets forth a logical process according to the invention of the related patent application.

The logical processes are preferably implemented in part in the mobile system's enhanced ECM (e.g. firmware or software), in part in the customizable logical processes (e.g. Java, scripts, etc.) on the opportunity server, and in part by the provider's servers. These logical processes are shown in FIG. 4 with their cooperative interactions.

When the enhanced ECM detects a fault condition, failure, or out-of-range measurement (41) on the mobile system, it produces (42) one or more DTCs, and transmits those with the mobile system's time and location to the opportunity server, preferably via a wireless network.

The opportunity server then receives (43) the DTC's, and proceeds to check the user's profile and the provider profiles (18, 19) which are in the area of the next expected point of service (e.g. next or closest town, port, airport, etc.). Then, the DTC's are processed (45) to create requests for bids for the needed service repair, and are transmitted via the computer network to one or more provider servers.

Each provider servers receive (46) the requests, prepares (47) one or more offers if the provider is able to perform the maintenance service, and transmits these back to the opportunity server.

The opportunity server "coalesces" (e.g. modifies and combines) these offers by first screening them to meet the user's preferences, followed by organizing them into a format which is easily and uniformly presented to the mobile system operator. This may include performing text-to-speech conversion to allow for audible presentation via a telephone channel, adjusting and filtering graphics for presentation on a dashboard display which has limited capabilities, and minimizing text for quicker reading.

The coalesced offers are then transmitted preferably on the wireless network to the enhanced ECM, where they are presented to the mobile system operator (49) through display, audio, or both. The user can then accept an offer (400), such as by making a verbal election or touching an icon on a touchscreen, which results in the selection being transmitted to the opportunity server, which in turn performs a confirmation transaction (400) with the winning provider server. The selected provider server then performs enterprise resource planning functions (403) to order and deliver replacement parts to the point of service, schedule appropriately skilled personnel to be on call at the expected time of arrival, and to reserve an appointment for service.

If the mobile system operator declines all offers (402), then the opportunity server may widen the "bid pool" to include service providers which are located at a subsequent point of service (e.g. two towns away, two ports away, etc.), and/or which do not completely meet the user's preferences. For example, if the user prefers to have his car repaired at dealer-owned shops but no dealers are found, the bid pool is widened to include any qualified shops for the user's make of car.

To annotate FIG. 4 by way of example, suppose a car modified according to the present invention in route from Dallas to Austin, Tex., undergoes a failure in the fuel system. The ECM detects that fuel pressure is abnormally low, but that sensors on the fuel injectors indicate acceptable fuel flow. This causes a first DTC to be created for a low fuel pressure, and a second DTC to be created for a potential root cause of a loose or damaged fuel filler cap (42). Additionally, the location of the vehicle is determined using GPS, and a third time-location DTC is created.

When the opportunity server receives (43) these 3 DTC records, it immediately consults the user's profile and finds that he prefers to have his car repaired by the dealers associated with the manufacturer of his vehicle. So, using the location information, a database of providers is searched looking for dealers in the next town where the vehicle will be arriving, perhaps Waco, Tex., and towns which the vehicle has recently passed, perhaps Temple, Tex. This determination of points of service within the vehicle's vicinity can be made several ways. In its simplest form, the user may input the towns on the ECM's user interface, which can be included in the third DTC. Alternately, two successive GPS measurements can be made, which can be used to calculate vehicle direction and velocity, which can also be included in the DTC and used by the opportunity in conjunction with a digital map to determine upcoming towns on the vehicle's path. An estimated time of arrival can also be either calculated using this information, or provided directly by the vehicle operator.

Once a set of qualified providers has been determined, requests for bids can be transmitted to the provider's servers online, through means such as EDI, email, fax, etc. The providers' servers receive the requests, and in this example, determine if they can have parts (e.g. a fuel cap for the user's make and model of car) and skilled staff on hand at the estimated time of arrival of the vehicle. An offer can be generated, if desired, and transmitted back to the opportunity server, again using e-mail, EDI, fax, etc.

The opportunity server collects all of the returned offers, formats and filters (e.g. "coalesces") them for presentation to the user, and sends them to the vehicle using the wireless network. In our example, let's assume that the quote price from two dealers is too high for the driver to accept, so he rejects (102) all of the offers, which allows the opportunity server to search for dealers in the next farther towns, perhaps Austin, Tex., and Grand Prairie, Tex., as well as for non-dealer service shops in Waco capable of performing the repairs. Requests for bids are produced and transmitted (45), and offers from 2 dealers in Austin and a Pep Boys store in Waco are received, coalesced (48), and presented (49) to the driver.

The driver then may select a lower priced dealer offer in Austin, if available, or a closer offer from Pep Boys if it is less expensive, which then results in the scheduling (403) of the service at the selected provider's facilities.

Present Invention as Applied to this Scenario

Turning now to the present invention, we will use the foregoing scenario and system configuration to illustrate the methods and processes provided by the invention.

Figure 5:
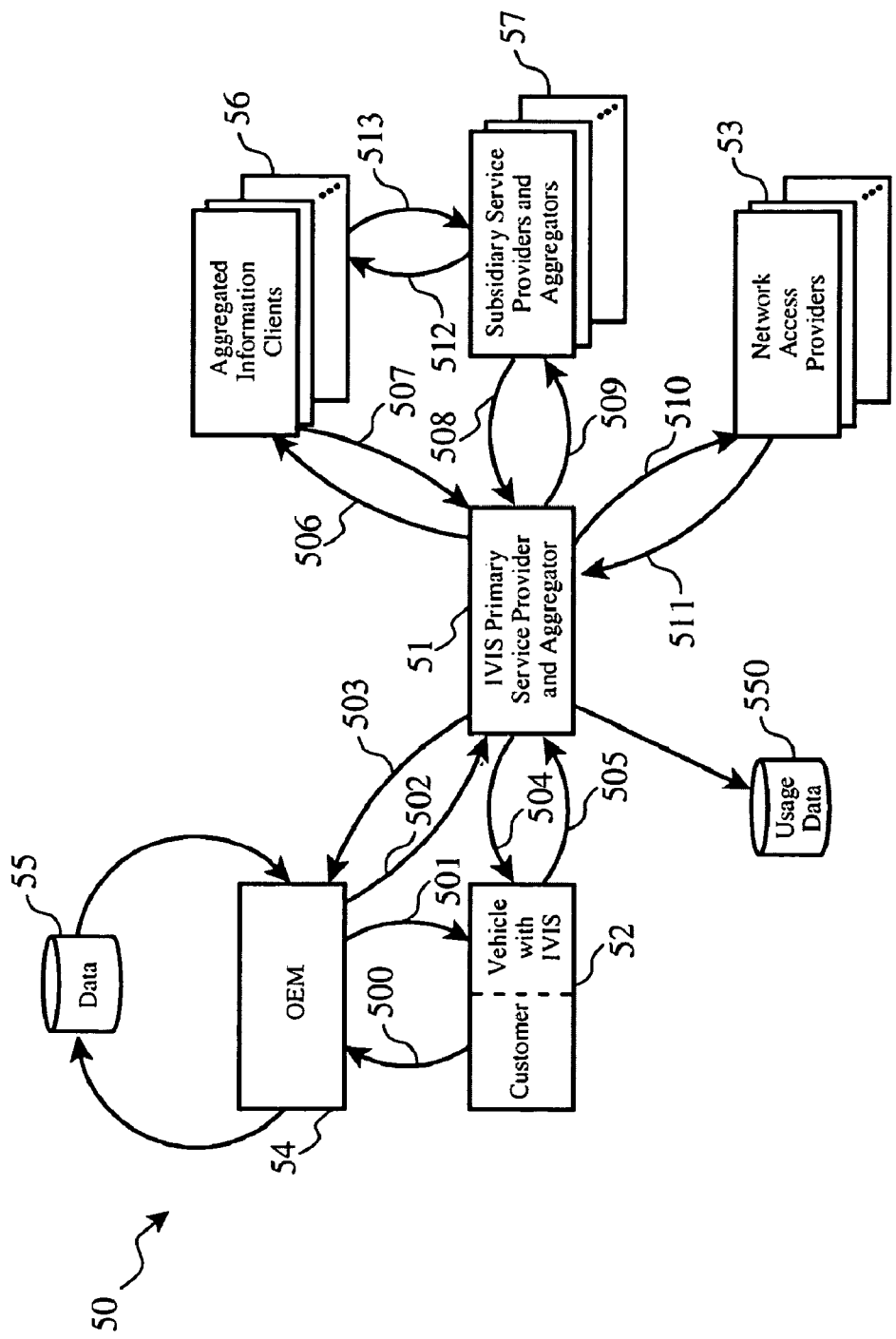
FIG. 5 shows the arrangement and flow of information, revenue and cost provided by the present invention.

In FIG. 5, a data flow and revenue flow arrangement or perspective of the system is shown. An opportunity server is configured to serve as the primary contact between other service providers, data aggregators, and as a revenue and cost sharing clearinghouse. Thus, the opportunity server acts in the role of IVIS primary service provider and primary aggregator ("primary SPA") (51), and communicates directly (504, 505) with the customer and vehicle IVIS (52) via one or more communications networks (e.g. Internet, WAN, PCS cellular, Blue Tooth, etc.).

Initially, the vehicle (52) is provided (501) with required IVIS hardware and software by an Original Equipment Manufacturer ("OEM") (54). The customer may pay (500) the OEM (54) for the equipment in part or full, depending on the business model adopted by the OEM (54). The OEM (54)

may choose to receive partial payment from the customer, and to participate (503) in revenue sharing with the rest of the participants of the system (50).

The primary SPA (51), then, provides direct communication of all services, web pages, information, etc., to the IVIS (52), and thus is in a position to measure and record usage in terms of data amount (bytes, megabytes, pages) and/or time. The primary SPA (51) randomly assigns an available session ID for the duration of an activity by the customer such as brokering and scheduling a car repair, or such as traveling on a tollway. By using a random ID value, storing the session ID without the customer's ID, and reusing the ID value for a subsequent customer, the session data is disassociated with the customer's true identity while maintaining information useful for marketing, analysis, and aggregation into statistical data sets.

As a form of an opportunity server, the PSPA (51) can broker (509) for services to one or more subsidiary service providers and aggregators ("subsidiary SPA") (57). As each subsidiary SPA (57) responds (508) to requests for quotes, data or information proxied from the IVIS (52), the primary SPA (51) receives these responses (509), and can measure their usage parameters (size, time, etc.). The primary SPA (51) may then transmit these to the IVIS, and record (550) in the current session the amount of data or time consumed for the transaction associated with the temporary anonymous session ID.

After a provider has been selected by the customer, the "winning" provider may be charged (509) for the value of the usage aggregated from all of the responding (508) providers. Additionally, a credit for the same amount can be posted (510) to the network access provider such as a PCS telephone company who provided the metered communications link between the primary SPA (51) and the IVIS (52), thus negating any cost to the customer to have used the system. In one embodiment, the primary SPA (51) may also charge a fee to the network access provider (53) and or the subsidiary SPA (57) for handling the transaction which resulted in network usage and service purchase.

In yet another embodiment option, the OEM (54) may participate in revenue sharing to offset its own cost of providing the IVIS platform by receiving payment (503) directed by the primary SPA (51) on a per usage basis, percentage of transcation value basis, or other sharing model. This provides the ability of the OEM to supply the IVIS platform at a lower-than-actual cost or no cost at all to the customer, thereby enabling the selling of services by the subsidiary providers (57).

At the end of a session, the primary SPA (51) may store all the session information with the temporary ID, but does not store the true customer's identity so that the session data is customer-agnostic. This insures privacy of each customer and alleviates concerns that the service or product which has been provided (e.g. "free" IVIS data services) has not resulted in a profile of the customer being created and sold.

In this example, the primary SPA (51) acted also as a primary aggregator of information by collecting the session information and storing it (550). In other scenarios and applications, the subsidiary SPAs (57) may also aggregate information, albeit in a different manner, typically. Each subsidiary SPA (57) can collect information from one session to another and form new pools of information and statistics. As the base information collected from each session is disassociated with the customers true identities, the aggregated information is by default also disassociated with any customer identities, although just as useful.

The customer-agnostic aggregated information can then be provided (512, 506) to clients (56) for such group, marketing and demographic information. Such information may include driving patterns and speeds needed by departments of transportation, safety bureaus and insurance companies. It might include numbers of cars and average speeds in certain corridors and roadways needed for urban planners. Just as well, it might represent usage information regarding features of hardware and software most often operated by vehicle drivers, to be used by OEM's and service providers for future product planning. Other companies, such as fuel suppliers, music and entertainment, as well as travel industry members can find useful aggregated information including where travelers stop and how long, how much they spend and on what, etc. In return for such accurate and useful information, the aggregated information clients (56) may make payment to the primary SPA (51) and/or subsidiary SPA(s) (57), which can then be applied to OEM costs (503) and network access costs (510) in some embodiments.

In general, as can be seen from this figure, the more consumers of the data, the wider spread the costs of operating the system can be. This allows the cost to the customer to be minimized, which will enable the consumer behavior to approach that of the flat-rate model (e.g. unlimited, apparently free use without sacrificing personal privacy).

Figure 6:
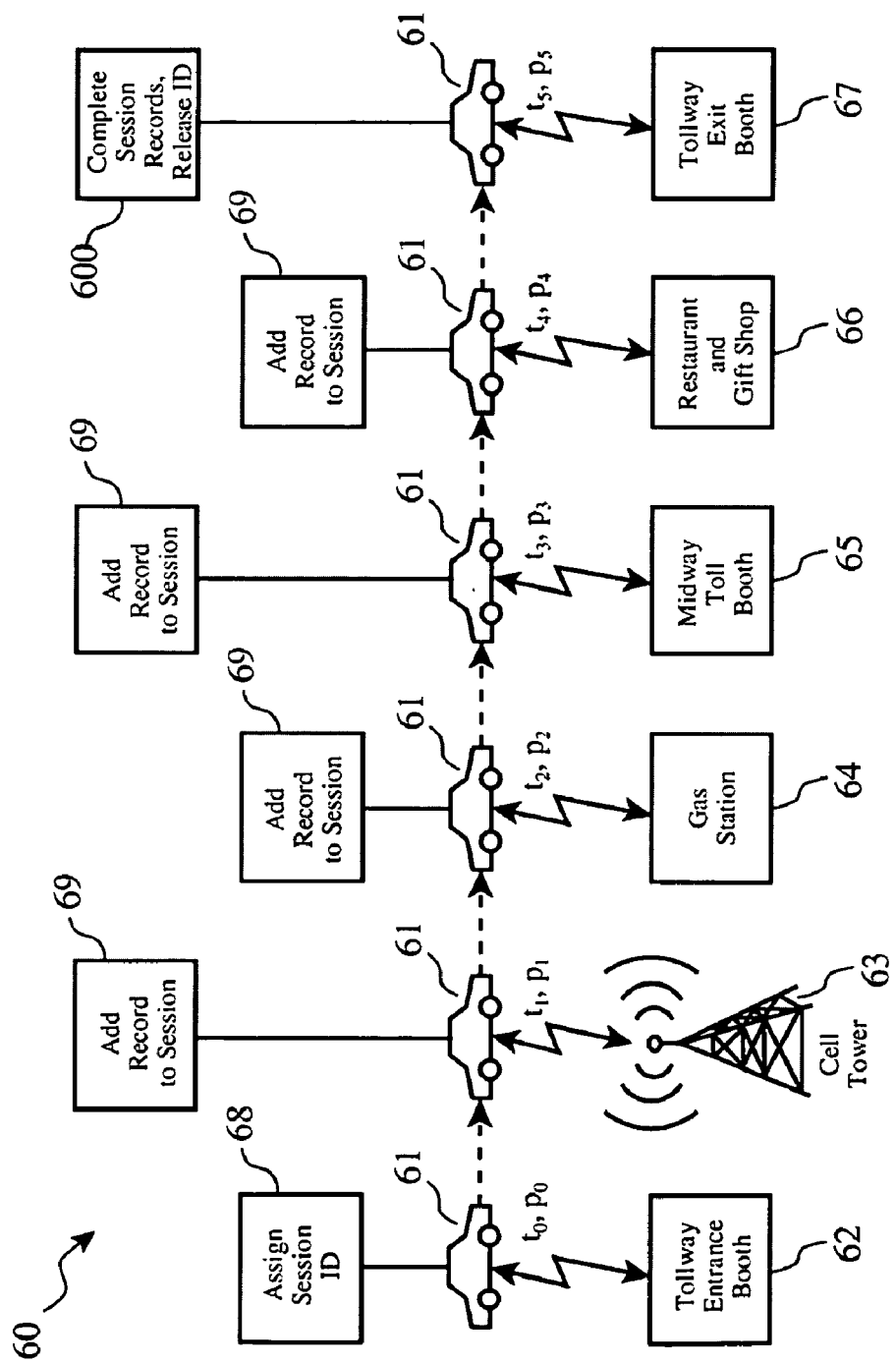
FIG. 6 provides and illustration useful for understanding an application of the anonymous session tracking capabilities of the present invention.

FIG. 6 provides a specific example of such uses. In this example, a vehicle (61) equipped with an IVIS as previously described travels along a tollway which is within a network capable of communicating with the IVIS. As the primary SPA and subsidiary SPA's may be geographically located close to or far from the actual wireless network interfaces to the vehicle, there is no requirement that the rest of the infrastructure previously described be near the tollway.

As the vehicle (61) enters the tollway at $t_0$, $p_0$, equipment such as a Blue Tooth transmitter or an LBS server make contact with the IVIS, thereby triggering an anonymous session ID to be associated (68) with a new session record set. As the vehicle travels along the tollway and within a cell tower (63) range at $p_1$, a record can be created (69) in the session indicating the time $t_1$ at which the vehicle arrived at this point, and other information can be recorded as available from the vehicle (e.g. speed, failure alerts, radio station tuned, etc.).

As the vehicle (61) continues to travel on the tollway, it may also pass a gas station (64), a midway tollbooth, a restaurant and gift shop, and eventually a tollway exit booth (67), each time creating a record within the session. Upon exit of the tollway, the session data is stored associated with the anonymous ID, and the ID value is made available for association with another vehicle. Table 1 shows an example data set which may have been collected during the vehicle's travel on our hypothetical tollway.

TABLE 1

Example Session Record Set format: record_number, time, position, speed, engine_status, radio_status start_session = AQ3D4j9;
1, 7:30am, toll_entrance_A, 35, OK, off;
2, 7:40am, tower_A, 70, OK, on-preset_1;
3, 7:46am, shell_station, 67, OK, on-preset_1;
4, 8:02am, midway_boot, 54, OK, on-preset_2;
5, 8:11am, bills_fast_food, 79, low_fuel_pressure, off;
6, 8:35am, exit_boot_C, 25, low_fuel_pressure, off;
end_session = AQ3D4j9;

In post processing of the session data, the speed of the vehicle at each point of contact can be determined, which can yield interesting aggregated data for transportation departments, urban planners, and the travel industry. If the vehicle reported which radio station was being played, that too can be analyzed for patterns interesting to the entertainment industry. If the operator brokered services such as hotel reservations or a car repair, certain industries may find this aggregated information useful. As such, each session record set provides useful, actual information regarding a consumer's activities, preferences and habits, albeit anonymous data. Multiple session record sets may be average and further analyzed to yield larger interpretations about consumer classes, groups, and strata.

The invention presented herein meets the objectives and needs not presently met by systems and methods currently available. It allows an operator of a mobile system or vehicle to effectively use online services without the undesirable and prohibitive costs to do so. It also allows for cost and revenue sharing, and mining of consumer behavior information disassociated with specific users, thereby ensuring privacy of use.

It will be recognized by those skilled in the art that certain details in the example embodiments have been disclosed for the purpose of illustration, and do not represent limitations or restrictions to the scope of the present invention. Rather, many variations in embodiment, features, and uses may be made without departing from the scope of the invention. As such, the scope of the present invention is determined by the following claims.

What is claimed is:

1. An opportunity server system comprising:
    a computing platform having hardware means for performing a logical process, an operating system, and a web server suite;
    an identifier controller portion of the computing platform configured to, upon the beginning of a location-based service brokering session on behalf of a user, temporarily associate a random anonymous session identifier value with a session record set and with a location based services access device, the location based service access device traveling with a vehicle, the session record set being anonymous with respect to the user, with respect to an account associated with the user, and with respect to any identifiers for the user;
    a request distributor portion of the computing platform configured to broker a request for repair service of the vehicle with a plurality of potential vehicle repair service providers by transmitting the anonymous session identifier and the service request to each potential vehicle repair service provider;
    an offer receiver portion of the computing platform configured to receive from the potential vehicle repair service providers a plurality of offers of vehicle repair service in response to the repair service request, each vehicle repair service provider identifying a cost associated with responding to the repair request for service, and certifying availability of necessary parts, tools, and trained personnel to complete the repair service;
    a cost analyzer portion of the computing platform configured to determine a total response cost by aggregating the costs of responding from responding potential vehicle repair service providers, the total response cost being stored into the session record set;
    a offer selector portion of the computing platform configured to determine at least one winning offer from a responding vehicle repair service provider;
    a usage tracker portion of the computing platform configured to create records of resource usage for each transaction subsequently made by the access device of service provided by the winning vehicle repair service provider during the session to yield an aggregated session record set, and to, upon completion of the session, store the session record set;
    a cost and revenue calculator portion of the computing platform configured to:
        determine a cost to the access device for resource usage during the session representing a gross revenue due to the winning service provide;
        determine a net revenue due to the winning service provider by reducing the gross revenue by the total response cost, and
        subsequently, enabling the identifier controller to re-use the session record set for a plurality of location based services access devices;
    wherein the opportunity server thereby aggregates usage records with previously aggregated usage records, and offsetting costs to compensate non-winning responders.

2. The system as set forth in claim 1 wherein the cost and revenue calculator is configured to determine a cost based upon data amount transferred between one or more provider servers.

3. The system as set forth in claim 1 wherein the cost and revenue calculator is configured to determine a cost based upon time of network usage during the session.

4. The system as set forth in claim 1 wherein the cost and revenue calculator is further configured to post a credit to an account associated with an original equipment manufacturer in an amount related to a compensatory payment.

5. The system as set forth in claim 1 wherein the cost and revenue calculator is further configured to credit an account associated with an in-vehicle information system original equipment manufacturer in an amount related to the resource usage cost.

* * * * *